United States Patent [19]

Nagel et al.

[11] Patent Number: 5,358,549
[45] Date of Patent: Oct. 25, 1994

[54] METHOD OF INDIRECT CHEMICAL REDUCTION OF METALS IN WASTE

[75] Inventors: Christopher J. Nagel, Wayland, Mass.; Robert D. Bach, Gross Pointe, Mich.

[73] Assignee: Molten Metal Technology, Inc., Waltham, Mass.

[21] Appl. No.: 33,846

[22] Filed: Mar. 19, 1993

Related U.S. Application Data

[63] Continuation-in-part of Ser. No. 879,978, May 5, 1992, Pat. No. 5,324,341.

[51] Int. Cl.$^5$ ............................................. C22B 60/00
[52] U.S. Cl. ........................................... 75/414; 423/5
[58] Field of Search ............................... 75/414; 423/5

[56] References Cited

U.S. PATENT DOCUMENTS

| | | | |
|---|---|---|---|
| 2,953,445 | 9/1960 | Rummel | 48/216 |
| 3,043,681 | 7/1962 | Udy et al. | 75/133.5 |
| 3,291,597 | 12/1966 | Mellgren et al. | 75/63 |
| 3,615,356 | 10/1971 | Grenfell | 75/60 |
| 4,120,698 | 10/1978 | Atchison et al. | 75/82 |
| 4,346,661 | 8/1982 | Nakamura | 110/259 |
| 4,415,358 | 11/1983 | Metz et al. | 75/58 |
| 4,469,510 | 9/1984 | Metz et al. | 75/51 |
| 4,532,113 | 7/1985 | Chao et al. | 423/138 |
| 4,574,714 | 3/1986 | Bach et al. | 110/346 |
| 4,602,574 | 7/1986 | Bach et al. | 110/346 |
| 4,831,943 | 5/1989 | Aune | 110/346 |
| 5,177,304 | 1/1993 | Nagel | 588/201 |
| 5,191,154 | 3/1993 | Nagel | 588/201 |
| 5,202,100 | 4/1993 | Nagel et al. | 423/5 |

FOREIGN PATENT DOCUMENTS 1233013 2/1988 Canada.
0085153 4/1982 European Pat. Off..

OTHER PUBLICATIONS

Sumitomo Metal Ind., "Ferroalloy Manufacture Method Add Ore Oxide Alloy Element Iron Melt Carbonaceous Fuel Oxygen Blow." (From *Derwent Publications Ltd.,* London, GB, Week 8324, May 04, 1983, Abstract No. J58073742).

Nippon Jiryoku Senk, "Recover Nickel Cadmium Battery Waste Charge Battery Chip Fuse Steel Recover Cadmium Vapour Nickel Alloy." (From *Derwent Publications Ltd.,* London, GB, Week 8943, Sep. 12, 1989, Abstract No. J01228586).

*Primary Examiner*—Peter D. Rosenberg
*Attorney, Agent, or Firm*—Hamilton, Brook, Smith & Reynolds

[57] ABSTRACT

An environmentally sound process is described for the remediation of waste materials that allows the separation, recovery and decontamination of metals. The method includes chemically reducing essentially all of a reducible toxic and potentially hazardous metal-containing component of a waste composition. The waste is directed into a molten metal bath, including a first reducing agent which, under the operating conditions of the molten metal bath, chemically reduces a metal of the metal-containing component to form a dissolved intermediate. A second reducing agent is directed into the molten metal bath. The second reducing agent, under the operations of the molten metal bath, chemically reduces the metal of the dissolved intermediate. The rate at which the second reducing agent is directed into the molten metal bath, relative to the rate at which the component of the waste is directed into the molten metal bath, is sufficient to cause essentially all metal-containing intermediate formed to dissolve in the molten metal bath, thereby indirectly chemically reducing the component of the waste. This indirect reduction technology can remediate a variety of materials, including ash metal-contaminated municipal waste, vitreous slag-like materials and spent metal catalysts, while allowing the recovery of remediable metals.

35 Claims, 1 Drawing Sheet

METHOD OF INDIRECT CHEMICAL REDUCTION OF METALS IN WASTE

RELATED APPLICATIONS

This is a continuation-in-part of U.S. Ser. No. 07/879,978, filed on May 5, 1992, now U.S. Pat. No. 5,324,341, the teachings of which are hereby incorporated by reference.

BACKGROUND OF THE INVENTION

Disposal of hazardous waste is increasingly becoming a problem. The availability of suitable space for burial of such wastes is diminishing. Also, contamination of the environment by conventional methods of disposal, such as by dumping and incineration, is increasingly apparent. For example, metals, such as lead, which are often present in hazardous wastes, do not decompose. Release of hazardous wastes to the environment as gases and dust, such as fly ash, often contaminates water supplies and pollutes the atmosphere, thereby generally diminishing the quality of life in surrounding populations.

Those with heightened awareness of onsetting ecological problems are not only cognizant of the increasing problems of waste disposal but also of the impending hazards associated with the large volume of residual materials generated by the incineration of all forms of waste. Incineration generally results in incomplete combustion due to inefficient combination with oxygen and the presence of noncombustible inorganic salts and metals. This typically affords a residue in excess of twenty five percent of the initial mass of the waste material and often in excess of seventy percent. Since a mass balance must be maintained, except for the loss of mass due to water, nitrogen and related gases, the combination of carbonaceous materials with oxygen affording carbon dioxide actually increases the mass of off-gases by a factor of about three. Although the overall process achieves a desirable volume and mass reduction, the concentration of noncombustible toxic material is necessarily increased and is often contained within a leachable ash residue. Fly ash also continues to pose a more recognizable hazard since, as noted above, land-filling is being deemphasized as a viable disposal method. Attempts to reduce the volume of residue by more complete combustion is associated with an economic penalty due to post-combustion stages and the need for excess auxiliary fuels. Despite these efforts, the lower flame temperature indigenous to classical incineration methodologies combined with the associated temperature of their residuals are features that still assure that generic ash is typically below its fusion point and unvitrified. Such unvitrified residues are commonly leachable in nature and constitute an environmental hazard since the toxic constituents are now in a more concentrated form and may readily enter the ecosystem.

In addition, hazardous waste streams, such as fly ash produced by oil-fired thermal generating power stations, include valuable metals, such as nickel and vanadium. Attempts to recover such metals from fly ash have included, for example, smelting of fly ash in an arc flash reactor. However, chemical reduction of metal oxides in an arc flash reactor is generally incomplete. Further, other components of a metal-containing composition, such as hazardous waste-containing organic components, can release hazardous organic materials, such as dioxins, to the atmosphere during processing in an arc flash reactor.

Direct metal reduction technology involves directing a reducing agent, such as carbon, through the molten metal bath to thereby chemically reduce metal oxides. The overall objective is to selectively reduce oxides contained in ore as rapidly as possible to reduce production costs. The reducing agent, typically, is injected into, or more commonly onto, a molten metal bath at a rate and in an amount sufficient to react with metal oxides which are not dissolved in the molten metal bath. Reactions carried out under such heterogeneous conditions are highly inefficient because of a relatively low collision frequency of reactant molecules and cannot ensure a chemically remediated reduced species for recovery. Consequently, the amount of reducing agent which is introduced to the molten metal bath typically is significantly in excess of the theoretical amount required to chemically reduce the metal oxide. The rate at which the reducing agent is introduced to the molten metal bath is often sufficient to entrain metal oxides before they can dissolve in the molten metal bath for reduction therein. Such entrainment further diminishes chemical remediation of the remediable species.

SUMMARY OF THE INVENTION

The present invention relates to a method for indirect chemical reduction of a component of a waste.

The method includes directing a waste, containing the component, into a molten metal bath. The molten metal bath includes a metal-containing first reducing agent which, under the operating conditions of the molten metal bath, chemically reduces the component of the waste composition to form a dissolved metal-containing intermediate. The metal of the metal-containing intermediate is exposed to a second reducing agent which, under the operating conditions of the molten metal bath, chemically reduces the metal at a rate, relative to the rate at which the component of the waste is directed into the molten metal bath, which is sufficient to cause essentially all metal-containing intermediate formed to dissolve in the molten metal bath for subsequent reduction of the metal component of the intermediate, thereby indirectly reducing the component of the waste.

This invention has many advantages. For example, essentially all of the subsequently formed dissolved intermediate is dissolved in the molten metal bath. The dissolved intermediate mixes with the second reducing agent as a solute in the molten metal bath, thereby increasing the efficacy of particle collision and the efficiency of heat transfer in the molten metal bath. Under these conditions, the reduction step is under thermodynamic control and is therefore highly efficient. Consequently, the overall reaction yield is significantly increased relative to high volume production methods which indiscriminately blow carbon onto a molten metal bath. Another distinct advantage of reduction of the dissolved intermediate is that only near-stoichiometric amounts of the second reducing agent carbon are required. Hence, the amount of off-gases released from the molten metal bath and consequent demand for off-gas treatment are substantially reduced. Also, the volume of highly toxic metals, such as cadmium, zinc, mercury and arsenic, and chemically contaminated ash, sludge, dust, etc. that are either emitted to the atmosphere or landfilled, are reduced substantially by the method of the invention because it affords a means for separating, chemically remediating, purifying, and recovering commercial products from contaminated substances.

DETAILED DESCRIPTION OF THE INVENTION

The features and other details of the method of the invention will now be more particularly described with reference to the accompanying figure and pointed out in the claims. It will be understood that particular embodiments of the invention are shown by way of illustration and not as limitations of the invention. The principal features of this invention can be employed in various embodiments without departing from the scope of the invention.

The present invention generally relates to a method for recovering metal from a metal-containing waste composition, by chemically reducing metal of a component of the waste in a molten metal bath. Examples of suitable waste compositions include metal-contaminated sludge, ash, dust and soil. The waste composition can include at least one radioactive component, such as a radioactive component which is a member of the actinides group. It is to be understood, however, that the waste composition can include more than one metal-containing component. Examples of suitable heavy metals of the metal-containing component include lead, mercury, cadmium, zinc, tin, and arsenic. Examples of suitable precious metals of the metal-containing component include titanium, vanadium, niobium, chromium, cobalt, nickel, silver, and platinum. Examples of other suitable metals include copper and iron. The metal-containing component of the waste composition can be, for example, an oxide, a sulfide, a phosphide, a nitride or a halide. Specific examples of suitable metal-containing components include nickel sulfide (NiS), iron oxide (FeO) and vanadium oxychloride (VOCl).

In one embodiment, the waste composition includes a first metal-containing component which can be reduced by a first reducing agent in a molten metal bath to form a metal-containing intermediate. Optionally, the waste composition can include organic components which can be dissociated in a molten metal bath to their atomic constituents. The initial thermal exposure of organic compounds to the operating environment of the reaction zone induces bond rupture or fragmentation that transforms the substances into a more oxidizable (open shell) form. Examples of suitable waste compositions include: mixed waste which includes various polymeric materials resulting from printed circuit board production; mixed waste which includes nickel ligands and various organic constituents; and vanadium and/or molybdenum catalysts employed in the epoxidation of alkenes.

Figure 1:
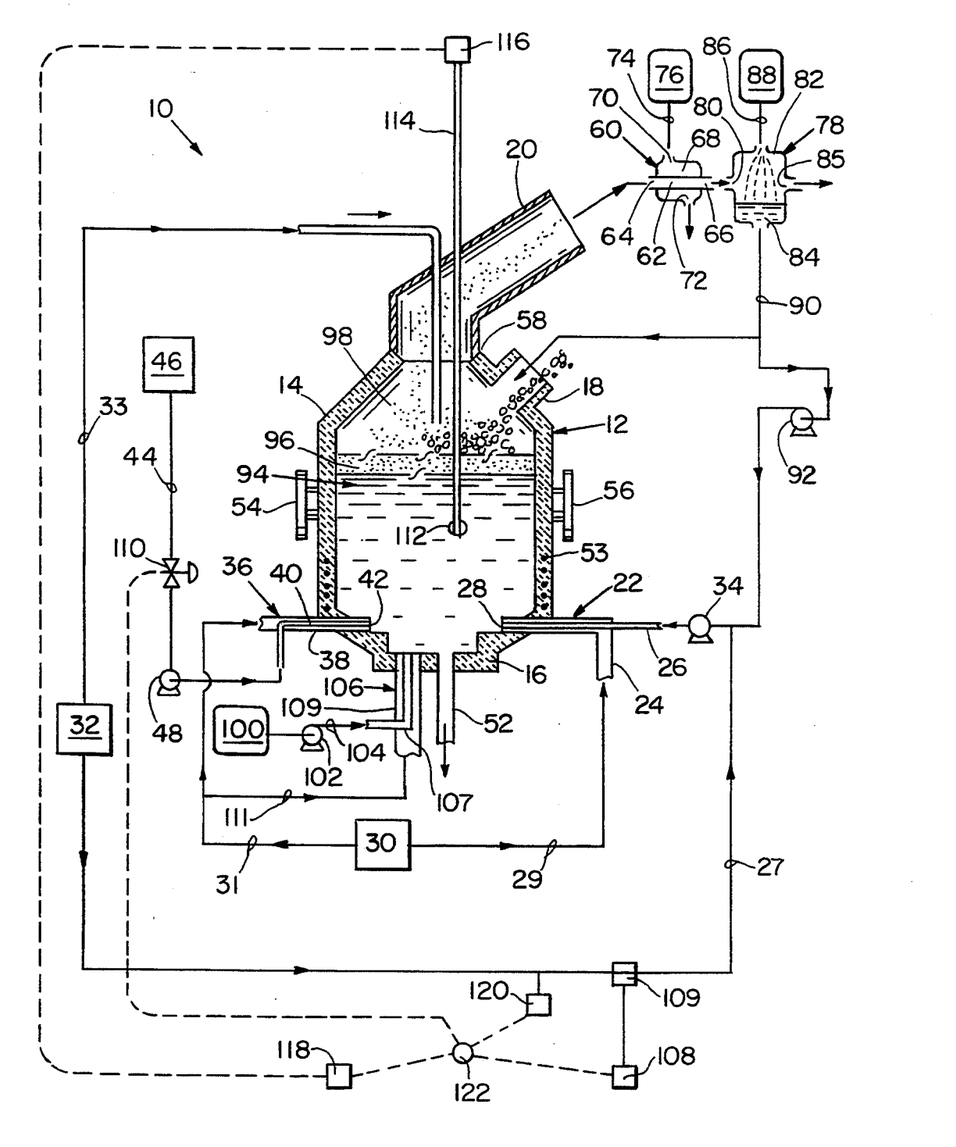
The Figure is schematic representation of a system and of a cross section of a reactor of the system for conducting the method of the invention.

System 10, illustrated in the Figure, is one embodiment of a system suitable for practicing the method of the invention. System 10 includes reactor 12. Examples of suitable vessels include K-BOP, Q-BOP, argon-oxygen decarbonization furnaces (AOD), EAF, etc., such as are known in the art of steelmaking. Reactor 12 has an upper portion 14 and a lower portion 16. Waste inlet 18 at upper portion 14 of reactor 12 is suitable for directing waste into reactor 12. Off-gas outlet 20 extends from upper portion 14 and is suitable for conducting an off-gas out of reactor 12.

Waste tuyere 22 is disposed at lower portion 16 of reactor 12 and includes shroud gas tube 24 and waste inlet tube 26. Waste tuyere 22 includes waste tuyere opening 28 at lower portion 16 of reactor 12. Shroud gas tube 24 extends from shroud gas conduit 29 to waste tuyere opening 28 at reactor 12. Shroud gas conduit 29 extends from shroud gas source 30 to shroud gas tube 24. Waste inlet tube 26 extends from waste source conduit 27 to waste tuyere opening 28 at reactor 12. Waste source conduit 27 extends from waste source 32 to waste inlet tube 26. Waste inlet tube 26 is disposed within shroud gas tube 24 at waste tuyere opening 28. Pump 34 is disposed at waste source conduit 27 to direct a suitable waste from waste source 32 through waste tuyere opening 28 into reactor 12.

Waste tuyere 22 is dimensioned and configured for continuously introducing a suitable metal-containing waste composition into reactor 12. It is to be understood, however, that the waste can be introduced to reactor 12 intermittently, rather than continuously. It is also to be understood that more than one waste tuyere can be disposed in reactor 12. Further, it is to be understood that waste can be introduced into reactor 12 by directing waste through from waste source 32 through conduit 33 into reactor 12, through waste inlet 18, or by other suitable methods, such as by employing a consumable lance, etc.

Reducing agent tuyere 36 is disposed at lower portion 16 of reactor 12 at a location remote from waste tuyere 22. Waste tuyere 22 is sufficiently remote from reducing agent tuyere 36 to allow essentially all of a first metal oxide which is directed into reactor 12 to be reduced by a first reducing agent in a molten metal bath disposed in reactor 12 under the operating conditions of system 10.

Reducing agent tuyere 36 includes shroud gas tube 38 and reducing agent inlet tube 40. Reducing agent tuyere includes reducing agent tuyere opening 42. Reducing agent inlet tube 40 is disposed within shroud gas tube 38 at reducing agent tuyere opening 42. It is to be understood that more than one reducing agent tuyere can be disposed at reactor 12. Also, it is to be understood that reducing agent tuyere 36 can be dimensioned and configured for either continuous or intermittent introduction of a reducing agent into a molten metal bath in reactor 12.

Shroud gas tube 38 extends from shroud gas conduit 31 to reducing agent tuyere opening 42. Shroud gas conduit 31 extends from shroud gas source 30 to shroud gas tube 38. Reducing agent inlet tube 40 extends from conduit 44 to lower portion 16 of reactor 12. Conduit 44 extends from reducing agent source 46 to reducing agent inlet tube 40. Pump 48 is disposed at conduit 44 for directing a suitable second reducing agent from reducing agent source 46 through conduit 44 and reducing agent inlet tube 40 into reactor 12.

Bottom-tapping spout 52 extends from lower portion 16 and is suitable for removal of at least a portion of a molten metal bath from reactor 12. Additional bottom-tapping spouts, not shown, can be provided as a means of continuously or intermittently removing at least a portion of a molten metal bath from reactor 12. Material can also be removed by other means, such as are known in the art of steelmaking. For example, material can be removed from reactor 12 by rotating reactor 12 and employing a launder, not shown, extending from waste inlet 18. Alternatively, the launder can extend into reactor 12 through a tap-hole, not shown.

Induction coil 53 is disposed at lower portion 16 for heating a molten metal bath within reactor 12 or for initiating generation of heat within reactor 12. It is to be understood that, alternatively, reactor 12 can be heated by other suitable means, such as by oxyfuel burners, electric arc, etc. Trunions 54,56 are disposed at reactor 12 for manipulation of reactor 12. Seal 58 is disposed between reactor 12 and off-gas outlet 20 and is suitable for allowing partial rotation of reactor 12 about trunions 54,56 without breaking seal 58. Alternatively, reactor 12 does not include trunions 54,56 or seal 58 and does not rotate.

Heat exchanger 60 is disposed at off-gas outlet 20. Heat exchanger 60 can be any suitable heat exchanger for cooling off-gas discharged from reactor 12. Examples of suitable heat exchangers include water-cooled hoods, shell-and-tube heat exchangers, etc. In one embodiment, heat exchanger 60 is a shell-and-tube heat exchanger which includes off-gas side 62 defining off-gas inlet 64 and off-gas outlet 66. Heat exchanger 60 also includes coolant side 68 which defines coolant inlet 70 and coolant outlet 72. Conduit 74 extends between coolant source 76 and coolant inlet 70 of heat exchanger 60. A coolant which is suitable for cooling off-gas is disposed at coolant source 76. Examples of suitable cooling media include, for example, water, ethylene glycol, ethylbenzene, alcohols, etc.

Scrubber 78 is disposed at off-gas outlet 66 of heat exchanger 60. Scrubber 78 is suitable for removing a component of the off-gas to form a stream which can be directed into reactor 12 or disposed of by some other suitable means. An example of a suitable scrubber is a caustic-type scrubber. Scrubber 78 defines off-gas inlet 80, scrubber fluid inlet 82, scrubber fluid outlet 84 and off-gas outlet 85. Conduit 86 extends between scrubber fluid source 88 and scrubber fluid inlet 82 of scrubber 78. A scrubber fluid which is suitable for separating at least one component of off-gas from the off-gas is disposed at scrubber fluid source 88. Examples of suitable scrubber fluids include sodium hydroxide (NaOH), calcium hydroxide (Ca(OH)$_2$), etc.

Conduit 90 extends from scrubber outlet 84 to waste inlet 18 of reactor 12 and to waste inlet tube 26 of waste tuyere 22. Pump 92 is disposed at conduit 90 for directing scrubber fluid from scrubber 78 to reactor 12.

A reaction zone within system 10 includes molten metal bath 94, vitreous layer 96 and gaseous phase 98. In one embodiment, molten metal bath 94 includes a first reducing agent, such as a metal component. The first reducing agent can chemically reduce a component of a waste directed into molten metal bath 94 because the dissolved intermediate formed by reaction of a metal of the component of the waste with the first reducing agent, has a lower Gibbs free energy of formation than the component. Alternatively, a first reducing agent can be directed into molten metal bath 94 during chemical reduction of a metal of the waste component in molten metal bath 94 according to the method of the present invention.

Examples of suitable first reducing agents, which are metal components of molten metal bath 94, include iron, chromium, manganese, copper, nickel, cobalt, etc. It is to be understood that molten metal bath 94 can include more than one metal. For example, molten metal bath 94 can include a solution or alloy of metals. Also, it is to be understood that molten metal bath 94 can include oxides or salts, such as oxides or salts of the bath metals. As disclosed in U.S. Pat. No. 5,177,304, the teachings of which are incorporated herein by reference, molten metal bath 94 can include more than one phase of molten metal. In one embodiment, a substantial portion of molten metal bath 94 is formed of oxides or salts. Alternatively, a substantial portion of the molten metal bath is formed of elemental metal.

In one embodiment, molten metal bath 94 is formed by at least partially filling reactor 12 with a metal. The metal is then heated to form molten metal bath 94 by activating induction coil 53 or by other means, not shown. Where a molten metal bath having immiscible phases is to be formed, two immiscible metals are introduced to reactor 12. The metals separate during melting to form a first molten metal phase and a second molten metal phase, which is immiscible in the first molten metal phase.

Vitreous layer 96 is disposed on molten metal bath 94. Vitreous layer 96 is substantially immiscible with molten metal bath 94 and typically includes at least one metal oxide. Alternatively, system 10 does not include vitreous layer 96. Typically, vitreous layer 96 has a low viscosity, allowing volatile free radicals and gases to pass from molten metal bath 94 through vitreous layer 96 and into gaseous phase 98. In one embodiment, vitreous layer 96 has a lower thermal conductivity than that of molten metal bath 94. Radiant loss of heat from molten metal bath 94 can thereby be reduced to significantly below the radiant heat loss for molten metal bath 94 in the absence of a vitreous layer. It is to be understood that vitreous layer 96 can include more than one metal oxide. Vitreous layer 96 can also include more than one phase.

Vitreous layer 96 can be formed by directing suitable materials into reactor 12 and then heating the materials in reactor 12 to a sufficient temperature to melt the materials. Vitreous layer 96 can also comprise slag or sludge contaminated with toxic metals or other valuable metals or their oxides that are suitable for reclamation. The materials can be directed onto the top of molten metal bath 94 or injected into molten metal bath 94, using methods such as are well known in the art of steelmaking. Examples of suitable materials for forming vitreous layer 96 include metal oxides, halogens, sulfur, phosphorous, heavy metals, sludges, etc. Examples of suitable metal oxides of vitreous layer 96 include titanium oxide ($TiO_2$), zirconium oxide ($ZrO_2$), aluminum oxide ($Al_2O_3$), magnesium oxide (MgO), calcium oxide (CaO), silica ($SiO_2$), etc. Components of the waste can also be included in vitreous layer 96. In one embodiment, vitreous layer 96 contains about 40% calcium oxide, about 40% silicon dioxide and about 20% aluminum oxide, and is about five inches thick in a quiescent state.

The materials employed to form vitreous layer 96 can become components of vitreous layer 96 by forming other stable compounds by chemical reaction, for example, with alkaline metal cations and alkaline earth metal cations. Examples of such reaction products include calcium fluoride ($CaF_2$) and magnesium phosphate ($Mg_3(PO_4)_2$). Additional examples include calcium sulfide and glasses containing volatile metal oxides, such as lead oxide.

Gaseous layer 98 extends from vitreous layer 96 at upper portion 14 of reactor 12 through off-gas outlet 20 to scrubber 78. Gaseous layer 98 includes off-gas formed in molten metal bath 94 and in vitreous layer 96. Off-gas is at least partially formed by volatilization and reaction of components of the waste to form gases, such as carbon monoxide and, optionally, carbon dioxide.

Waste is directed from waste source 32 through waste inlet tube 26 into molten metal bath 94 conjointly with a shroud gas, which is directed from shroud gas source 30 through shroud gas tube 24. The shroud gas directed into molten metal bath 94 through waste tuyere 22 is suitable for cooling a region within molten metal bath 94 proximate to waste tuyere 22 under the operating conditions of system 10. Examples of suitable shroud gases include nitrogen gas ($N_2$), steam, methane ($CH_4$), chlorobenzene ($C_6H_5Cl$) etc. In one embodiment, chlorobenzene is converted by exposure to molten metal bath 94 to form hydrocarbon-fragment radicals and chlorine radicals.

It is to be understood that the metal-containing waste composition can be introduced anywhere within the reaction zone which is sufficiently remote from the location in the reaction zone at which a second reducing agent is directed into molten metal bath 94. For example, the metal-containing composition can be directed into reactor 12 through waste inlet 18 as whole articles.

Suitable operating conditions of system 10 include a temperature of molten metal bath 94 which is sufficient to cause a first reducing agent in molten metal bath 94 to chemically reduce a metal-containing component of the waste directed into molten metal bath 94 and thereby form a dissolved metal-containing intermediate. Further, the temperature of molten metal bath 94 is sufficient to cause a second reducing agent, directed into molten metal bath 94, to chemically reduce the metal of the dissolved intermediate at a rate sufficient to cause essentially all of the metal containing intermediate formed to dissolve in molten metal bath 94. The first reducing agent has a Gibbs free energy of oxidation which is less than that of the metal component of the first metal oxide. In one embodiment, the stoichiometric ratio of the metal-containing component of the waste composition of the first reducing agent is about equal to, or greater than, about 1:1.

The waste directed into reactor 12 combines with molten metal bath 94 and can also combine with vitreous layer 96. Contact of the waste with molten metal bath 94 or vitreous layer 96 exposes the waste to conditions sufficient to cause a first metal-containing component of the waste composition to be chemically reduced by a first reducing agent in molten metal bath 94 and thereby form a dissolved intermediate. In one embodiment, the first reducing agent is a component of molten metal bath 94. For example, the first reducing agent can be elemental iron in a molten iron bath, wherein the molten metal bath is an "active bath." The high stoichiometric ratio of the bath metal to the metal of the metal-containing components increases the propensity for iron oxide (FeO) formation. Alternatively, the first reducing agent can be directed into molten metal bath 94 by a suitable means, such as through a tuyere, not shown. In this alternative embodiment, the molten metal bath does not react with the first metal oxide and, therefore, is a "passive bath."

The dissolved intermediate migrates through molten metal bath 94 from a portion of molten metal bath 94 proximate to reducing agent tuyere 36. The dissolved intermediate can also migrate by a suitable means, such as by agitation of molten metal bath 94 or by diffusion.

Molten metal bath 94 can be agitated by a suitable means, such as by introduction of the shroud gas or by directing the metal-containing composition or the second reducing agent into molten metal bath 94 at a rate which is sufficient to cause turbulent flow in molten metal bath 94.

The second reducing agent is directed by pump 48 from reducing agent source 46 through conduit 44 and reducing agent inlet tube 40, and through reducing agent tuyere 36 into molten metal bath 94. The second reducing agent dissolves in the bath and is suitable for chemically reducing the metal of the dissolved intermediate in the reaction zone. In one embodiment, the stoichiometric rate-ratio of introduction of the second reducing agent to that of the metal of the metal-containing intermediate in molten metal bath 94 is greater than about 1:1. Also, the rate of reaction between the dissolved intermediate and the second reducing agent is sufficient to cause essentially all metal-containing intermediate formed to dissolve in molten metal bath 94 for subsequent reduction of the metal component of the intermediate. An example of a suitable second reducing agent is carbon. Examples of other suitable second reducing agents include boron, silicon, ferrosilicone, etc.

The rate at which the second reducing agent is directed into molten metal bath 94 is sufficient, relative to the rate at which the metal component of the first metal constituent is directed into molten metal bath 94, to chemically reduce the metal of the dissolved intermediate at a rate which causes essentially all intermediate formed to dissolve in molten metal bath 94 for subsequent reduction of the metal component of the intermediate, thereby indirectly reducing the component of the waste composition. In one embodiment, the rate at which the second reducing agent is directed into molten metal bath 94 is sufficient to maintain a steady-state concentration of dissolved intermediate in the bath.

The reduction is "indirect" in that the metal of the component of the waste is reduced by reaction with a first reducing agent metal to form a dissolved intermediate. The metal of the dissolved intermediate is, thereafter, reduced by reaction with a second reducing agent, which restores the first reducing agent. The first reducing agent is thereby available for continued reduction of additional dissolved intermediate.

The metal of the dissolved intermediate, following reduction by the second reducing agent, can dissolve in molten metal bath 94. Optionally, the metal can be recovered from molten metal bath 94 by a suitable method. For example, the metal can be volatilized by halogenating the metal with chlorine.

When molten metal bath 94 is an "active bath," the waste component can be a metal-containing contaminant which includes an oxide, phosphide, nitride, sulfide, or halide. The metal of molten metal bath 94 reacts with the waste component to form a metal-containing dissolved intermediate. In one specific embodiment, for example, the waste component is nickel sulfide, which reacts with elemental iron of a molten iron bath. The reaction products include dissolved iron sulfide, as the intermediate, and elemental nickel. A metal-ligand exchange reagent (MLER) is directed into molten metal bath 94 from MLER source 100, by activation of pump 102, through conduit 104 and tuyere 106. Tuyere 106 includes inner tube 107 and outer tube 109. Conduit 104 is connected to inner-tube 107. Tuyere 106 can be cooled by a shroud gas from shroud gas source 30. Shroud gas is conducted from shroud gas source 30 through conduit 31 and conduit 111 to outer tube 109 of tuyere 106.

Examples of suitable MLER's include calcium oxide, magnesium oxide, etc. The MLER reacts with dissolved intermediate in a metal ligand exchange reaction to form metal-ligand exchange products (MLEPs). One of the MLEP's includes the metal of the dissolved intermediate. The other MLEP is substantially insoluble in molten metal bath 94 and migrates to vitreous layer 96. The second reducing agent is directed from reducing agent source 46 through tuyere 36 into molten metal bath 94, where it reacts with the metal of the MLEP which was derived from the dissolved intermediate. For example, if calcium oxide was the MLER, which reacted with iron sulfide (FeS), which was the dissolved intermediate, the MLEP's would be iron oxide (FeO) and calcium sulfide (CaS). The calcium sulfide would migrate to vitreous layer 96. A suitable second reducing agent, such as carbon, would react with the iron oxide to form carbon monoxide (CO), which would escape from molten metal bath 94 as a gas, and elemental iron. The reactivity of the second reducing agent with the MLEP, in this case iron oxide, is much greater than with either of the MLERs (FeS or CaO). The rate at which the second reducing agent reduces the metal of the metal-ligand exchange product is sufficient to cause essentially all metal of the metal-containing intermediate formed to be reduced in the molten metal bath, thereby indirectly reducing the component of the waste.

In another embodiment of this invention, the waste composition includes, in addition to the metal-containing component which can be reduced by the first reducing agent, a second metal-containing component, which is not reducible under the conditions of molten metal bath 94 by either the first reducing agent or the second reducing agent. In this embodiment, a sacrificial metal can be directed into molten metal bath 94 after the second reducing agent has reduced the metal of the dissolved intermediate. The sacrificial metal has a free energy of oxidation which is lower than that of the second reducing agent and is directed into molten metal bath 94 in an amount which is sufficient to reduce at least a substantial portion of the second metal-containing component.

In circumstances under which the waste source 32 and the second reducing agent source 46 have well-characterized compositions, the two rates are easily arranged to have the appropriate stoichiometry for substantially complete final reduction of the oxygen-containing metal compositions.

Otherwise, it becomes necessary to determine at least the approximate amounts of the reactive components of the respective compositions. Reactive components are those that will undergo reaction in the bath. The determination of the effective concentrations of the reactive components may be made by direct or indirect analytical techniques, such as those which are well known in the art. These techniques may be automatic, semi-automatic or manual, depending on the nature of the sources. Automatic techniques can be employed which involve gathering compositional data from the two sources, processing them through a computer and then leading them to conventional servomechanisms for regulating the desired rates in order to achieve the appropriate stoichiometry.

Monitoring of the molten metal bath compositional changes, as well as the compositions of the vitreous phase slag and off-gas, are also important. These analytical measurements may give indirect information regarding the relation of the waste source and the reducing agent source. If, for example, the amount of the dissolved intermediate in the bath becomes excessive, the rate of the second reducing agent will have to be decreased. In a similar manner, if the concentration of the second reducing agent (carbon or carbonaceous materials, for example) in the bath has increased considerably, then either the rate of injection of the second reducing agent will have to be decreased, or the rate of introduction of the waste source into the bath will have to be increased. The concentration of the intermediate is considered to be excessive if it exceeds its solubility limits in the metal bath, and starts migrating to the vitreous layer. Similarly, the concentration of the second reducing agent, carbon, for example, should be monitored such that its concentration does not exceed its solubility in the bath. Thus, it is very important to remain within the solubility limits of these reactants in the bath, and operate as close as possible to the desired stoichiometric ratio for optimization of the reaction and minimization of off-gas emissions.

It is evident that during this process, the concentrations of the dissolved intermediate and the second reducing agent do not have to reach excessive values for corrective action to be taken. On the contrary, it is highly desirable to correct the deviations from the optimum stoichiometry as soon as they are detected, and in a manner, which is as continuous as possible. Changes in material balance may be made from different inlets, depending on what corrective action is desired to be taken. As an example, such inlets include, but are not limited to waste inlet 18, conduit 33, waste tuyere 22, reducing agent tuyere 36, and the like.

Emission spectroscopy is a highly effective analytical method for determining metal concentrations in the different inlets, mainly when the waste is in the form of liquid solution, dispersion, aerosol, fluidized powder, and the like.

Real time analysis is possible because a sample may be taken in short time intervals, or even continuously, and analyzed almost instantaneously. Use of Inductively Coupled Plasma techniques in Flow Injection Analysis are of particular interest, since they provide high elemental coverage (at least 70 elements), low detection limits (0.1 to 100 ng/mL), simultaneous multi-element capability, good precision (0.5–2% RSD), and broad dynamic range (4–6 orders of magnitude). Details on such analytical techniques are given in "Inductively Coupled Plasma Emission Spectroscopy", Edited by P. W. J. M. Boumans, published by John Wiley & Sons, New York.

In more detail, application of the method described depends on maintaining a dynamic equilibrium between the waste and reducing agents. The present invention addresses this issue by integrating specific control mechanisms for guaranteeing necessary process conditions, even when systematically changing the throughput and composition of the waste.

The scope of this invention covers the use of any control mechanism for maintaining dynamic equilibrium which measures, either directly or indirectly, the accumulation of the metal oxide waste and/or the reducing agents within the vessel. Such measurements can be used in a feedback manner for manipulating either the flow of the waste or the second reducing agent into the reactor, although this example is not meant to restrict other mechanisms integrating these measurements. For example, other measurements could also be used within feed forward or cascade control configurations. Typically, implementation is done by computer control, though it is not restricted to this method.

There are numerous methods for measuring the accumulation of the waste and/or reducing agents in the bath. One could measure these directly using a sampling device, such as a Minco sampler, coupled with an optical emission spectroscope (OES) and inductively coupled plasma (ICP) device. Alternatively, novel techniques involving laser-based measurement could be used. Indirect measurement may be accomplished by measuring gas phase compounds with continuous emission monitoring (CEM) in conjunction with a mathematical model of the process to quantify the accumulation in the bath. Any such methods could be used within the context of this discussion.

The implementation of such process control can be made clearer by use of an example. The use of this example, however, in no way precludes other control implementations using the above mentioned measurements. In this example, it is assumed that nickel oxide is the metal oxide and is fed only from metal waste source 32. Iron is the first reducing agent, carbon is the second reducing agent, and the flow of nickel oxide into the bath is governed by other factors (e.g. set at a fixed rate, set by another control loop, etc.). Referring to the Figure, the nickel oxide content of the stream directed from metal waste source 32 is measured using X-ray fluorescence spectrometer 108, and the rate of flow of the stream is measured with flow meter 109. These measurements are fed into control block 122 which manipulates, in a feed forward manner, the flow rate of carbon in stream 46 to maintain it at a desired ratio with respect to the rate of nickel oxide addition in waste stream 32. Manipulation is achieved by using valve 110 to adjust the flow.

This feedforward loop responds quickly to changes in the nickel oxide waste rate and can maintain-optimal carbon waste rates for a short time, but is inadequate for maintaining necessary operating conditions over long durations. To achieve long term operation at desired conditions, the bath is sampled using Minco sampler 112 in sampling lance 114 to obtain samples. Iron oxide content is measured using OES and ICP 116. This measurement is fed into a computer control block 118 which, when FeO concentrations are at unacceptable levels, adjusts the ratio setpoint parameter of control block 122 to maintain long term operation at desired conditions. The implementation of control blocks 118 and 122 are based on dynamic models of the process, and can be accomplished by those skilled in the art.

Off-gas formed in the reaction zone can include at least one of the reaction products formed by chemically reducing the second metal oxide with the second reducing agent. For example, reaction of a second metal oxide with carbon, as the second reducing agent, can cause formation of carbon monoxide gas. The carbon monoxide gas is released from molten metal bath 94 into gas layer 98 and becomes a component of the off-gas. Other components of off-gas formed in reactor 12 can include hydrogen gas, water, etc. formed by chemical transformation of other components of the metal-containing composition, such as organic compounds.

Off-gas formed in reactor 12 is conducted from the reaction zone through off-gas outlet 20 to heat exchanger 60. The off-gas is cooled in heat exchanger 60 by conducting the off-gas through off-gas side 62 of heat exchanger 60 and by directing a suitable cooling medium through a coolant side 68 of heat exchanger 60. The off-gas is conducted into heat exchanger 60 through off-gas inlet 64 and then through off-gas outlet 66. The coolant is directed from coolant source 76 through coolant inlet 70 of heat exchanger 60 by a suitable means, such as by use of a pump, not shown. The coolant is directed through the coolant side 68 of heat exchanger 60, thereby cooling the off-gas, and is then directed out of heat exchanger 60 through coolant outlet 72. The coolant is conducted through heat exchanger 60 at a rate sufficient to cool the off-gas to a temperature suitable for subsequent formation of a liquid composition from the cooled off-gas. In one embodiment, the off-gas is cooled to a temperature below about 500° C.

The off-gas is directed out of off-gas outlet 66 to scrubber 78 in order to expose the off-gas to conditions sufficient to remove at least one component from the off-gas for further processing, such as return to reactor 12 or for treatment in an additional reactor, not shown. Examples of methods for treatment of the off-gas, including separation and processing of components of the off-gas, are disclosed in U.S. Pat. No. 5,177,304, the teachings of which are included herein by reference. In those cases where the off-gases contain volatile readily reducible metals such as zinc, mercury and cadmium, the gases can be directed to a condenser and recovered by condensation. The gaseous metal vapors can be condensed and the liquid metal and alloys can be tapped in a suitable manner, such as by scrubbing. Optionally, material that accumulates at the condenser can be recycled to the reaction zone. The nonvolatile metals can be tapped as an alloy or ferrous alloy from the iron bath. Also, carbon monoxide can be a recoverable product of the method.

Metal recovery of non-volatile metals may be particularly advantageous in this invention where the principal metal of the waste, the first metal oxide, is the same as the bath metal, thereby affording a bath enriched in a recoverable metal. For example, molten copper can be employed as the bath metal for recovery of copper metal from waste streams highly enriched in the oxides of copper. In those cases where the free energy of formation of the oxide of the bath metal is higher than that of a metal contaminant present in the waste, it may be advantageous to use a sacrificial metal with a highly negative free energy of oxidation, relative to the first metal oxide.

The following are illustrations of various applications of the method of the invention to chemically reduce a metal oxide of a metal-containing composition.

Illustration I

A metal-containing spent catalyst includes iron-(III)oxide ($Fe_2O_3$) and molybdenum(IV) oxide ($MoO_2$) as first metal oxides. Molten bath 94 includes iron as a first reducing agent. The metal-containing composition is directed from waste source 32 through waste inlet tube 26 of waste tuyere 22 into molten bath 94. Essentially all of the iron oxide and molybdenum oxide are chemically reduced by the first reducing agent, iron, in molten bath 94. The incipient metal oxide (FeO) dissolves upon contact with the bath metal to form the solvated second metal oxide, iron(II)oxide (FeO). The dissolution of essentially all the second metal oxide in molten bath 94 ensures facile reduction of the contaminant oxide to its pure metallic state. The dissolved iron-(II)oxide migrates through molten bath 94 from a portion of molten bath 94 proximate to waste tuyere 22 to a portion of molten bath 94 which is proximate to reducing agent tuyere 36.

Carbon is employed as a second reducing agent. The carbon is directed from reducing agent source 46 through conduit and reducing agent tuyere 36 into molten bath 94. The rate of introduction of the carbon, relative to the combined rate of introduction of iron-(III)oxide and molybdenum(IV)oxide, is sufficient to chemically reduce the iron(II)oxide at a rate which allows the deliberate solubilization of essentially all iron(II)oxide, subsequently formed during introduction of additional metal-containing composition into molten bath 94 for chemical reduction. The dissolved iron-(II)oxide is chemically reduced by the carbon and enriches the bath in iron, and the molybdenum metal remains dissolved in the bath. The overall process constitutes a reductive-extraction of insoluble metal oxides and dissolution of their corresponding metals in the bath.

Illustration II

A waste treatment sludge is treated as a metal-containing composition that includes EPA designated toxic metals as first metal oxides. The toxic waste contains the normal valent oxides of cadmium (Cd), cobalt (Co), chromium (Cr), copper (Cu), iron (Fe), potassium (K), molybdenum (Mo), sodium (Na), nickel (Ni), lead (Pb), sulfur (S), tin (Sn), tungsten (W) and zinc (Zn). Molten bath 94 includes manganese (Mn) as the first reducing agent.

The metal-containing composition is directed into molten bath 94 through waste tuyere 22. Essentially all of the first metal oxides are chemically reduced by the manganese to form a second metal oxide, manganese oxide (MnO). Essentially all of the manganese oxide dissolves in molten bath 94. The manganese oxide migrates from a portion of molten bath 94 proximate to waste tuyere 22 to a portion of molten bath 94 proximate to reducing agent tuyere 36.

Carbon, as the second reducing agent, is directed into molten iron bath 94 through reducing agent tuyere 36. Boron, silicon or titanium can also serve as the second reducing agent. The rate of introduction of carbon, relative to the combined rate of introduction of first metal oxides, is moderated to allow the carbon to chemically reduce the manganese oxide intermediate in its dissolved state at a rate which assures that essentially all subsequently formed manganese oxide remains dissolved in molten bath 94. Reduction of the dissolved manganese oxide by carbon returns the manganese to its pure elemental form and produces carbon monoxide as an off-gas.

The stoichiometry of manganese is comparable to or exceeds the equilibrium concentration of the first metal oxide and the concentration of carbon is comparable to or greater than the equilibrium concentration of the second metal oxide. The effective concentration of Mn and its exceptionally low Gibbs free energy of oxidation ensures that essentially all of the waste metal oxides are rapidly stripped of their oxygen atoms, by oxygen atom transfer to Mn, upon entering the bath.

Illustration III

The metal-containing composition, comprised of nickel compounds containing various ligands (L), and containing nickel metal, nickel alkyls, oxygen-containing nickel organometallic complexes and nickel oxide and including either a single metal oxide, such as uranium oxide, or a variety of metal oxides having free energies of oxidation lower than that of carbon, are placed in equilibrium in a substantially homogeneous iron bath. The introduction of first metal oxides, contained in the metal-containing composition, are chemically reduced by the iron, forming a second metal oxide, iron oxide (FeO), and affording inclusion of the metals comprising the first metal oxides, into the molten iron bath. Essentially all of the iron oxide dissolves in molten bath 94. The iron oxide migrates from a portion of molten bath 94 proximate to waste tuyere 22 to a portion of molten bath 94 proximate to reducing agent tuyere 36. Carbon, as the second reducing agent, is directed into molten iron bath 94 through reducing agent tuyere 36. The rate of introduction of carbon, relative to the combined rate of introduction of the first metal oxides, is moderated to allow the carbon to chemically reduce the iron oxide intermediate in its dissolved state at a rate which assures that essentially all subsequently formed iron oxide remains dissolved in the molten bath 94. Reduction of the dissolved iron oxide by carbon returns the iron to its elemental form and produces carbon monoxide as an off-gas. Processing of the metal-containing composition continues to dissolve the metals of the first metal oxide into the liquid iron phase and accumulates those metal oxides which are not reducible by carbon into the vitreous phase.

Upon concentration of the unreduced metal oxides, such as uranium oxide, into the vitreous phase, the feeding of the metal-containing composition into molten bath 94 is suspended and a third reducing agent, having a free energy of oxidation which is lower than the free energy of oxidation of the remediable metal oxides concentrating in the vitreous phase, is injected into molten bath 94. Introduction of the third reducing agent, subsequent to the introduction of the second reducing agent, selectively reduces metal oxides accumulating in the vitreous phase. Examples of suitable third reducing agents include magnesium, aluminum, calcium and zirconium.

Illustration IV

A finely-ground spent refractory brick containing chromium oxide ($Cr_2O_3$) and highly toxic chromium(-VI)oxide ($CrO_3$) as first metal oxides and as recoverable contaminants within a vitreous residue is either disposed in a molten iron bath or preferably injected (through tuyere 22) into the bath. Iron, as the first reducing agent, in the molten iron bath reacts with the oxides of chromium on the surface of a dispersed vitreous particle or at the interface between the vitreous phase and the iron bath phase to form iron(II)oxide, as the second metal oxide, and elemental chromium. Upon successive oxygen atom transfer steps both the iron-(II)oxide (FeO) and the chromium dissolve in the molten iron bath. Carbon, as the second reducing agent, is directed into the molten iron bath to react with the iron oxide and thereby form carbon monoxide gas and regenerate elemental iron. The chromium oxides are thus detoxified and the metal is recovered as a ferrochrome alloy.

Illustration V

A municipal sludge containing heavy metals and their oxides as contaminants (e.g., CdO, HgO, ZnO) is directed into molten iron bath 94 through waste tuyere 22. The combined metal oxides are all readily reduced to their metallic state by the bath metal iron and accrues therein for recovery. All volatile metals pass through the vitreous layer and exit molten bath 94 to be recovered by condensation of the metal vapors by off-gas treatment. The oxygen portion of metal oxide is converted to carbon monoxide via the intermediacy of iron(II)oxide. The carbon source is derived principally from carbonaceous materials in the sludge. Non-volatile metals are reduced and accrue to either the metal or vitreous layer depending upon their Gibbs free energies of oxidation.

Illustration VI

A finely divided residue from the calcination of spent platinum catalysts is introduced by-tuyere injection into a molten iron bath. The contaminated platinum oxide is reduced by the iron and the high boiling platinum metal accrues to the iron bath. The transient FeO is returned to its metallic state upon reduction by a carbon source derived from hydrocarbon gas introduced by injection as a shroud gas through tuyere or tube 24. Carbon monoxide and hydrogen exit the reactor. The platinum metal remains in the iron bath in its dissolved state and may be recovered and purified in a known manner.

Illustration VII

A waste composition which includes nickel sulfide (NiS), as a metal-containing waste component, is directed into a molten metal bath of elemental iron (Fe). The nickel sulfide reacts with the iron, as the first reducing agent, to form elemental nickel and iron sulfide (FeS). The iron sulfide is the intermediate and dissolves in the molten iron bath. Calcium oxide (CaO) is directed into the molten iron bath. A metal-ligand exchange reaction occurs between the iron sulfide and the calcium oxide to form iron oxide (FeO) and calcium sulfide (CaS). The calcium sulfide (CaS) migrates to the slag layer. Carbon (C), as the second reducing agent, is directed into the molten iron bath and reacts with the iron oxide to form carbon monoxide (CO) and elemental iron. The carbon monoxide escapes from the molten iron bath as a gas.

Illustration VIII

Nickel phosphate ($Ni_3(PO_4)_2$), as the metal-containing waste component of a waste composition, is directed into a molten metal bath of elemental iron (Fe). The nickel phosphate reacts with the iron, as the first reducing agent, to form elemental nickel (Ni) and iron phosphide. At least a portion of the iron phosphate, as the intermediate, dissolves in the molten iron bath. Magnesium oxide (MgO) is directed into the molten iron bath. A metal-ligand exchange reaction occurs between the iron phosphate and the magnesium oxide to form iron oxide (FeO) and magnesium phosphate ($MgP_2O_8$). The magnesium phosphate migrates to the slag layer. Carbon (C), as the second reducing agent, is directed into the molten iron bath and reacts with the iron oxide to form carbon monoxide (CO) and elemental iron. The carbon monoxide escapes from the molten iron bath as a gas.

Illustration IX

A waste composition which includes nickel chloride ($NiCl_2$), as a metal-containing waste component, is directed into a molten metal bath of elemental iron (Fe). The nickel chloride reacts with the iron, as the first reducing agent, to form elemental nickel (Ni) and iron chloride ($FeCl_2$). The iron chloride is the intermediate and dissolves in the molten iron bath. Magnesium oxide (MgO) is directed into the molten iron bath. A metal-ligand exchange reaction occurs between the iron chloride and the magnesium oxide to form iron oxide (FeO) and magnesium chloride ($MgCl_2$). The magnesium chloride volatilizes and is captured in the slag layer. Carbon (C), as the second reducing agent, is directed into the molten iron bath and reacts with the iron oxide to form carbon monoxide (CO) and elemental iron. The carbon monoxide escapes from the molten iron bath as a gas.

Illustration X

Nickel nitride, as a metal-containing waste component, is directed into a molten metal bath of elemental iron (Fe). The nickel nitrate reacts with the iron, as the first reducing agent, to form iron nitrate ($Fe(NO_3)_2$) and elemental nickel (Ni). The iron nitrate degrades in the molten iron bath to form iron oxide (FeO), as the dissolved intermediate, and nitrogen gas ($N_2 \uparrow$), which escapes from the molten iron bath. Carbon (C), as the second reducing agent, is directed into the molten iron bath and reacts with the iron oxide to form carbon monoxide (CO) and elemental iron. The carbon monoxide escapes from the molten iron bath as a gas.

Equivalents

Those skilled in the art will recognize, or be able to ascertain using no more than routine experimentation, many equivalents of the invention described specifically herein. Such equivalents are intended to be encompassed in the scope of the following claims.

We claim:

1. A method for indirect chemical reduction of a component of a waste, comprising the steps of:
    a) directing the waste, containing the component, into a molten metal bath, the molten metal bath including a metal-containing first reducing agent which, under the operating conditions of the molten metal bath, chemically reduces said component of the waste to form a dissolved metal-containing intermediate; and thereafter
    b) exposing the metal of the metal-containing intermediate to a second reducing agent in the molten metal bath, the second reducing agent, under the operating conditions of the bath, chemically reducing said metal at a rate, relative to the rate at which the component of the waste is directed into the molten metal bath, which is sufficient to cause essentially all metal-containing intermediate formed to dissolve in the molten metal bath for subsequent reduction of the metal component of said intermediate, thereby indirectly reducing the component of the waste.

2. A method of claim 1 wherein the first reducing agent is a component of the molten metal bath.

3. A method of claim 1 wherein the second reducing agent is directed into the molten metal bath at a rate which is sufficient, relative to the rate at which the metal-containing intermediate is formed, to cause essentially all of said intermediate formed to dissolve in the molten metal bath.

4. A method of claim 3 wherein the second reducing agent is directed into the molten metal bath at a location which is sufficiently remote from a point of introduction of the waste to cause essentially all of the metal-containing intermediate formed in the molten metal bath to dissolve prior to reduction of the metal of said intermediate by the second reducing agent.

5. A method of claim 4 wherein the second reducing agent and the metal of said component are directed into the molten metal bath at a stoichiometric ratio of about 1:1.

6. A method of claim 5 wherein the stoichiometric ratio of the first reducing agent in the molten metal bath, to the metal of the component of the waste, is greater than about 1:1 and the stoichiometric ratio of the second reducing agent to the intermediate is greater than about 1:1.

7. A method of claim 3 wherein the waste and the second reducing agent are directed into the molten metal bath at alternating intervals, whereby essentially all of the metal-containing intermediate formed in the molten metal bath dissolves prior to reduction of the metal of said intermediate by the second reducing agent.

8. A method of claim 1 wherein the waste includes more than one component which can be reduced by the first reducing agent in the molten metal bath.

9. A method of claim 8 wherein a metal component, which comprises a substantial portion of the molten metal bath, is also a metal component of the intermediate.

10. A method of claim 9 wherein the first reducing agent includes a metal in its elemental state.

11. A method of claim 10 further including the step of dissociating an organic component of the metal-containing composition to its respective elements.

12. A method of claim 1 wherein the second reducing agent includes carbon.

13. A method of claim 1 further including the steps of volatilizing the metal of the intermediate and then recovering the metal.

14. A method of claim 1 wherein the component is present in a sludge.

15. A method of claim 1 wherein the component is present in an ash.

16. A method of claim 1 wherein the component is present in a dust.

17. A method of claim 1 wherein the component is present in a soil.

18. A method of claim 1 wherein the component is a precious metal.

19. A method of claim 18 wherein the precious metal is selected from the group consisting essentially of titanium, vanadium, niobium, chromium, cobalt, nickel, silver and platinum.

20. A method of claim 1 wherein the component is a volatile heavy metal.

21. A method of claim 20 wherein the heavy metal is selected from the group consisting essentially of lead, mercury, cadmium, zinc, tin, and arsenic.

22. A method of claim 1 wherein the component is iron or copper.

23. A method of claim 22 wherein the oxygen-containing metal compound of the metal-containing waste composition comprises a metal oxychloride.

24. A method of claim 1 wherein the second reducing agent is a metal.

25. A method of claim 1 further including the step of directing a sacrificial metal into the molten metal bath after the second reducing agent has reduced at least a significant portion of the intermediate, the sacrificial metal being soluble in the molten metal bath and having a lower free energy of oxidation than the second reducing agent, whereby the sacrificial metal reacts with a second component of the waste composition which is substantially inert to the first and second reducing agents at the temperature of the molten metal bath.

26. A method of claim 25 wherein the sacrificial metal is selected from the group consisting of aluminum, magnesium, calcium, silicon, and mixtures thereof.

27. A method for the indirect chemical reduction of at least two components of a waste, comprising the steps of:
a) directing the waste into a molten metal bath, the molten metal bath including a first reducing agent which, under the operating conditions of the molten metal bath, chemically reduces a metal of a first component of the waste to form a dissolved metal-containing intermediate; and
b) exposing the metal of the intermediate to a second reducing agent in the molten metal bath, the second reducing agent, under the operating conditions of the molten metal bath, chemically reducing the intermediate at a rate, relative to the rate at which the first component of the waste is directed into the molten metal bath, which is sufficient to cause essentially all intermediate formed to dissolve in the molten metal bath for subsequent reduction of the metal component of the intermediate, thereby indirectly chemically reducing the first component of the waste; and thereafter
c) directing a sacrificial metal into the molten metal bath after the second reducing agent has reduced the intermediate, the sacrificial metal being substantially soluble in the molten metal bath and having a lower free energy of oxidation than the second reducing agent, whereby the sacrificial metal reacts with a metal of a second component of the waste, the second component being substantially inert to the first and second reducing agents at the temperature of the molten metal bath, thereby chemically reducing the metal of the second component of the waste.

28. A method of claim 27, wherein the molten metal bath includes nickel, vanadium, chromium, and iron, and the waste includes at least one of a nickel metal, a nickel oxide at any nickel valence state, a nickel alkyl, and an oxygen-containing nickel organic complex.

29. A method of claim 27 wherein the molten metal bath includes iron and the waste comprises at least one of a nickel metal, a nickel oxide at any nickel valence state, a nickel alkyl, and an oxygen-containing nickel organic complex.

30. A method of claim 27 wherein the waste includes at least one radioactive metal.

31. A method of claim 27 wherein the waste includes at least one of a nickel metal, a nickel oxide at any nickel valence state, a nickel alkyl, and an oxygen-containing nickel organic complex.

32. A method of claim 31 wherein the element of the radioactive component is selected from the actinides group.

33. A method of claim 27 wherein the sacrificial metal is introduced into the molten metal bath at such an amount and rate as to combine with substantially all of the oxygen of the second oxygen-containing metal compound.

34. A method for indirect chemical reduction of a component of a waste, comprising the steps of:

a) directing the waste into a molten metal bath, whereby a phase of the component is formed in the presence of a molten metal bath, the two phases being substantially immiscible, the molten metal bath including a-first reducing agent which, at the operating conditions of the molten metal bath, chemically reduces a significant portion of a metal of the component to form an intermediate and a reduced metal of said component at a surface of the molten metal bath which is in contact with the waste component phase, and wherein both the metal oxide and the reduced metal dissolve in the molten metal bath; and b) directing a second reducing agent into the molten metal bath to chemically reduce the metal of the intermediate at a rate comparable to that of the dissolution of the reduced metal of the waste component into the molten metal bath.

35. A method for chemically remediating a metal component of a metal-containing waste, comprising the steps of:

a) directing the waste into a molten metal bath which includes a first reducing agent that, under the operating conditions of the molten metal bath, chemically reduces said component containing the metal contaminant of the metal-containing waste to form a metal-containing intermediate and a reduced metal component of the waste;

b) exposing the metal of the metal-containing intermediate to a second reducing agent in the molten metal bath which, under the operating conditions of the bath, reduces said metal at a rate, relative to the rate at which the component of the waste is directed into the molten metal bath, which is sufficient to cause essentially all metal-containing intermediate formed to dissolve in the molten metal bath; and thereafter c) reclaiming the reduced metal component of the waste from the molten metal bath.

* * * * *